United States Patent [19]

Iwasaki et al.

[11] Patent Number: 5,157,694
[45] Date of Patent: Oct. 20, 1992

[54] COHERENT PSK DEMODULATOR USING BIT ERROR RATE AND S/N RATIO TO ESTABLISH SYNCHRONIZATION

[75] Inventors: Motoya Iwasaki; Susumu Otani, both of Tokyo, Japan

[73] Assignee: NEC Corporation, Tokyo, Japan

[21] Appl. No.: 824,716

[22] Filed: Jan. 17, 1992

Related U.S. Application Data

[63] Continuation of Ser. No. 435,084, Nov. 13, 1989, abandoned.

[30] Foreign Application Priority Data

Nov. 15, 1988 [JP] Japan .................. 63-288344

[51] Int. Cl.$^5$ .......................................... H04L 27/06
[52] U.S. Cl. ................................... 375/81; 375/85; 329/307; 371/46
[58] Field of Search .......... 375/85, 94, 97, 52, 375/53, 83, 81; 329/307; 371/5.4, 46, 43

[56] References Cited

U.S. PATENT DOCUMENTS

| | | | |
|---|---|---|---|
| 4,726,029 | 2/1988 | Motley et al. | 371/46 |
| 4,835,790 | 5/1989 | Yoshida et al. | 375/97 X |
| 4,837,766 | 6/1989 | Yoshida | 371/43 X |
| 4,945,549 | 7/1990 | Simon et al. | 375/53 |

Primary Examiner—Benedict V. Safourek
Assistant Examiner—Tesfacdet Bocure
Attorney, Agent, or Firm—Laff, Whitesel, Conte & Saret

[57] ABSTRACT

In a coherent M-ary PSK demodulator, an M-ary PSK detector demodulates a received M-ary PSK modulated convolutional code with a carrier recovered by a voltage-controlled oscillator to produce first and second channels of demodulated convolutional codes. A convolutional decoder decodes the signals of the first and second channels while correcting bit errors. An error rate detector is provided for detecting when the number of such errors occurring during a specified period of time is smaller than a predetermined value and generates a signal indicating that the convolutional decoder is synchronized with the demodulated signals. The power levels of signal and noise components of the demodulated channels are detected by a power detector. In a frequency control circuit, a series of VCO control signals of a different value are generated as candidates for precise synchronization in response to the signal from the error rate detector in order to synchronize the PSK detector successively at the candidate frequencies, and signal-to-noise ratios are successively derived from the outputs of the power detector. A maximum value of the derived signal-to-noise ratios is then detected and one of the candidate VCO control signals which corresponds to the detected maximum signal-to-noise ratio is adopted as a valid VCO control signal.

8 Claims, 4 Drawing Sheets

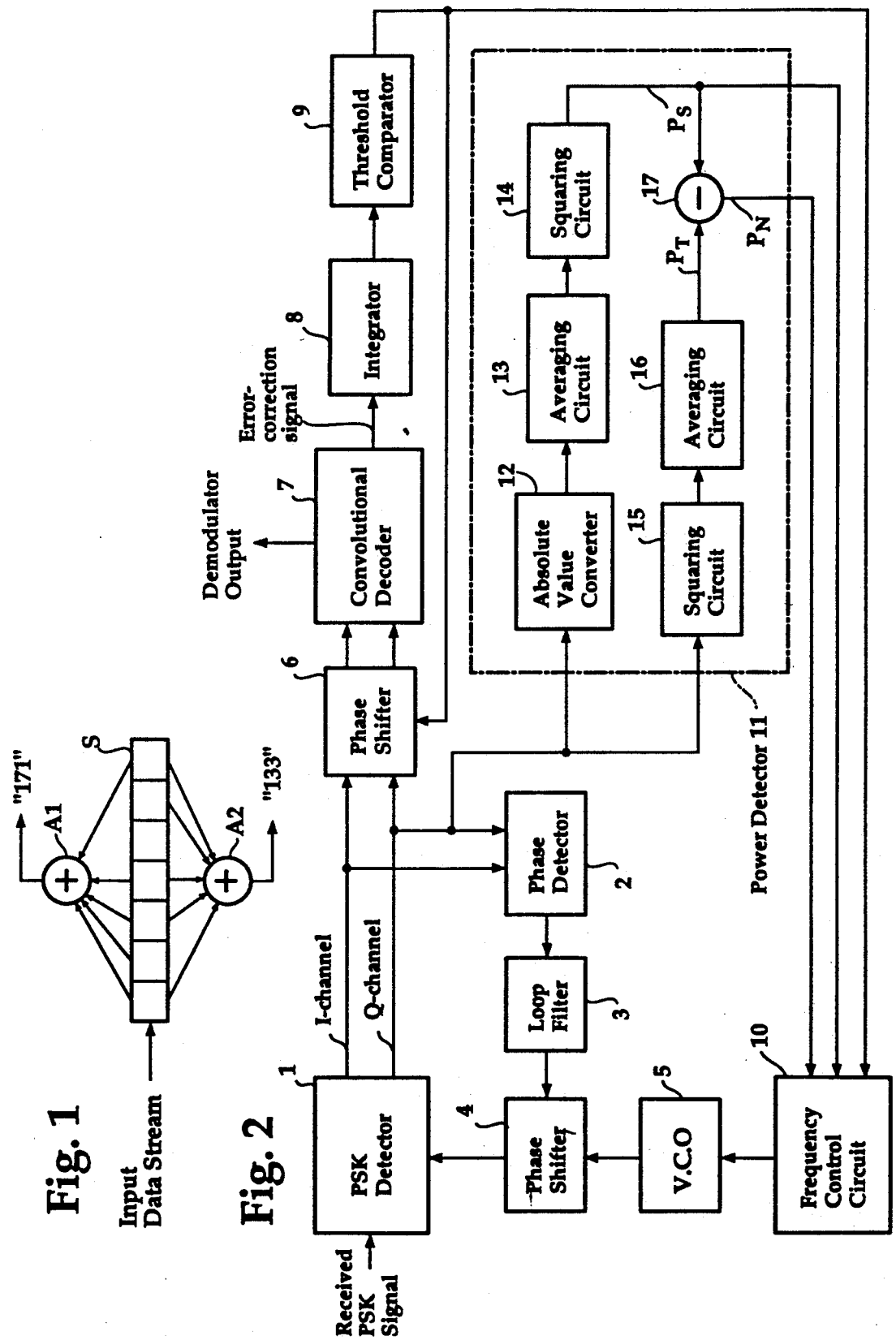

COHERENT PSK DEMODULATOR USING BIT ERROR RATE AND S/N RATIO TO ESTABLISH SYNCHRONIZATION

This application is a continuation of application Ser. No. 07/435,084, filed Nov. 13, 1989 now abandoned.

BACKGROUND OF THE INVENTION

The present invention relates generally to coherent PSK (phase shift keying) demodulators for M-ary PSK modulated convolutional codes, and more specifically, the present invention relates to a technique for recovering a carrier from a received PSK modulated convolutional code by precisely establishing synchronization with the received signal.

According to coherent detection which is used to demodulate a received M-ary PSK modulated convolutional code, the received signal is mixed with a local carrier to produce I- and Q-channel signals for coupling to a convolutional decoder and phase comparison is made between the demodulated signal and the local carrier to establish carrier synchronization. As described in Japanese Provisional Patent Publication (Tokkaisho) 59-12654, synchronization is established between the frequency of the recovered carrier and the symbol rate of received convolutional codes by detecting the error rate of the demodulated I- and Q-channel signals and reducing the error rate below a specified value through a feedback circuit. In this publication, a convolutional encoder is coupled to a convolution decoder. The output of the convolutional encoder and one input of the convolutional decoder are supplied to a correlator to determine their correlation. Since the output of the convolutional encoder is a replica of the original codeword, the correlator produces a signal which increases in amplitude with the error rate of the signal at the input of the convolutional decoder. A maximum detector is connected to the correlator to control the phase relation of the input signals of the convolutional decoder when the error rate exceeds a specified value.

However, the prior art technique tends to establish carrier synchronization even when the carrier frequency is not precisely coherent with the symbol rate of the received signal. Under this condition, the demodulator is said to be in a "quasi-coherent" state.

As an example of this quasi-coherent state, consider a BPSK system in which a 7-stage shift register S and exclusive OR gates A1 and A2 are used as a convolutional encoder as shown in FIG. 1. The bits stored in the first, second, third, fourth and seventh stages of the shift register S are supplied to exclusive OR gate A1 to produce a code word "171", and the bits stored in the first, third, fourth and sixth stages are supplied to exclusive OR gate A2 to produce a code word "133."

Let the input data stream at the input of a convolutional encoder be denoted by $D_n$ ($D_n = \pm 1$) and let the output data stream from the convolutional encoder be denoted by $C_n^{171}$ and $C_n^{133}$, then the following relations hold:

$C_n^{171} = D_n \times D_{n-1} \times D_{n-2} \times D_{n-3} \times D_{n-6}$
$C_n^{133} = D_n \times D_{n-2} \times D_{n-3} \times D_{n-5} \times D_{n-6}$ where, all binary data are represented by $+1$ and $-1$.

If carrier synchronization is precisely established, the demodulated data streams become equal to $C_n^{171}$ and $C_n^{133}$ and by decoding such data streams by an error correction circuit, or convolutional decoder, the original data $D_n$ can be recovered. However, if carrier synchronization is not precise, the demodulated data streams will become $C_n^{171'}$ and $C_n^{133'}$ and the following relations will hold between error corrected data $D'_n$ and the original data stream $D_n$:

$$D'_n = D_n(-1)^n$$

$$\begin{aligned}
C_n^{171'} &= D'_n \times D'_{n-1} \times D'_{n-2} \times D'_{n-3} \times D'_{n-6} \\
&= D_n \times D_{n-1} \times D_{n-2} \times D_{n-3} \times D_{n-6} \times \\
&\quad (-1)^{n+(n-1)+(n-2)+(n-3)+(n-6)} \\
&= C_n^{171} \times (-1)^{5n-12} \\
&= C_n^{171} \times (-1)^{5n} \\
&= \begin{cases} C_n^{171} & (n = \text{even}) \\ -C_n^{171} & (n = \text{odd}) \end{cases}
\end{aligned}$$

$$\begin{aligned}
C_n^{133'} &= C_n^{133} \times (-1)^{5n-2-3-5-6} \\
&= C_n^{133} \times (-1)^{5n} \\
&= \begin{cases} C_n^{133} & (n = \text{even}) \\ -C_n^{133} & (n = \text{odd}) \end{cases}
\end{aligned}$$

Therefore, a decoding process properly proceeds and a decision is made that synchronization has been established.

It is appropriate to discuss to some length BPSK modulation and demodulation processes for codewords $C_n^{171'}$ and $C_n^{133'}$.

Bit-parallel codewords $C_n^{171}$ and $C_n^{133}$ are converted to bit-serial data and supplied to a BPSK modulator producing the following data $B_m$:

$$\begin{cases} B_{2n} = C_n^{171} \\ B_{2n+1} = C_n^{131} \end{cases}$$

At the receive end, the demodulator produces bit-serial demodulated codewords $B'_m$ which are converted to bit-parallel codewords. If the codewords $B'_m$ have the following relations with the transmit data $B'_m$ $$B'_m \begin{cases} B_m & (m = 4k, 4k+1) \\ -B_m & (m = 4k+2, 4k+3) \end{cases}$$

data streams $C_n^{171'}$ and $C_n^{133'}$ will result from a demodulation process.

The demodulated data stream $B''_m$ will be given as follows if the frequency of the recovered carrier deviates as much as $f_s/4$, where $f_s$ is the symbol rate of the transmitted signal:

$$B''_m = B_m \cos\left(\frac{f_s}{2}\pi\frac{n}{f_s} - \frac{\pi}{4}\right)$$

$$= B_m \cos\left(\frac{n}{2}\pi - \frac{\pi}{4}\right)$$

$$= \begin{cases} \frac{1}{\sqrt{2}} B_m & (m = 4k, 4k+1) \\ -\frac{1}{\sqrt{2}} B_m & (m = 4k+2, 4k+3) \end{cases}$$

$$= \frac{1}{\sqrt{2}} B'_m$$

The value $B''_m$ is equal to $B'_m$ if binary levels are used for discrimination between a valid coherent state and a quasi-coherent state. Even if the frequency of the recovered carrier deviates by as small as ⅛ of the symbol rate, a quasi-coherent state can occur.

SUMMARY OF THE INVENTION

It is therefore an object of the present invention to provide a coherent PSK demodulator capable of establishing a valid coherent state with a received PSK modulated convolutional code.

The coherent PSK (phase shift keying) demodulator of the present invention has a PSK detector for demodulating a received PSK modulate convolutional code with a recovered carrier in order to produce first- and second-channel convolutional codes and a power level detector for detecting power levels of a signal component and a noise component of one of the first- and second-channel convolutional codes.

According to the present invention, the phase of the recovered carrier is controlled according to a phase difference between the first- and second-channel convolutional codes. The phase-controlled first- and second-channel convolutional codes are decoded while correcting errors in the convolutional code use error correction signals. The number of error correction signals which are generated during a predefined period of time is compared with a threshold value. A suboptimum frequency value of the recovered carrier is detected by continuously varying the carrier frequency until the number of error correction signals becomes smaller than the threshold value. The frequency of the recovered carrier is then varied so that it successively deviates from the suboptimum frequency value to produce frequency deviations. Successive values of signal-to-noise ratios are derived from the power levels which are respectively detected by the power level detector corresponding to the frequency deviations. A maximum value of the successive signal-to-noise ratios is detected and the corresponding frequency deviation is selected as an optimum frequency value at which the recovered carrier is thereafter maintained.

BRIEF DESCRIPTION OF THE DRAWINGS

The present invention will be described in further detail with reference to the accompanying drawings, in which:

FIG. 1 shows a representative convolutional encoder used in a modulator at the transmit end of a satellite communications system;

FIG. 2 is a block diagram of a synchronous demodulator at the receive end of the system according to the present invention;

DETAILED DESCRIPTION

Figure 3:
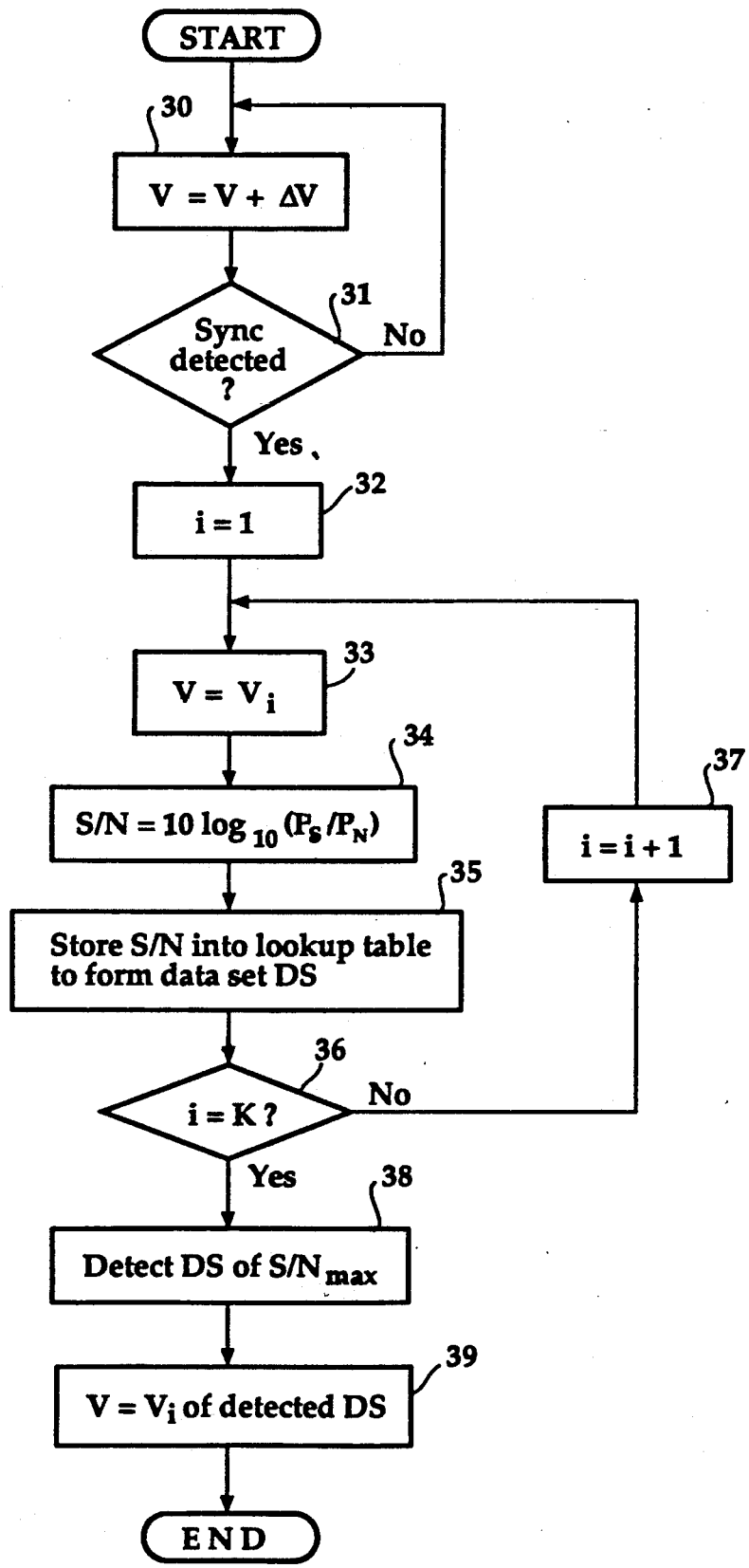
FIG. 3 is a flowchart describing steps performed by the frequency control circuit of FIG. 2.

Referring now to FIG. 2, there is shown a coherent M-ary PSK demodulator according to a preferred embodiment of the present invention. The demodulator comprises a PSK detector 1 by which a received M-ary PSK signal is demodulated into an in-phase, or I-channel signal and a quadrature signal, or Q-channel signal. The demodulated signals supplied to a phase detector 2 where a phase difference between the I- and Q-channel signals is detected and supplied through a loop filter 3 to a variable phase shifter 4 to introduce a variable amount of delay to a carrier supplied from a voltage controlled oscillator 5 in accordance with the detected phase difference.

The I- and Q-channel signals also are supplied through a phase shifter 6 to a convolutional decoder, or forward error correction (FEC) decoder 7 such as Viterbi decoder. FEC decoder 7 includes a copy of the convolutional encoder to decode the convolutional codes of both channels to generate a replica of the original data stream as a demodulator output in a known manner. The error correction signal, which is generated for the decoding process, is supplied to an integrator 8. The output of integrator 8 will increase as the error rate of the demodulated signals increase and hence it increases as a function of the amount of deviation of the recovered carrier frequency from the symbol rate of the received signal. A threshold comparator 9 is connected to the output of integrator 8 to generate a logical-1 output when the integrator output exceeds a predetermined threshold level. The logical-1 output thus indicates that a substantial amount of bit errors exists in the demodulated signals and hence it gives an indication that VCO 5 is not in synchronization with the symbol rate of the received PSK signal.

The output of threshold comparator 9 is supplied to the phase shifter 6 which may comprise a switch to establish "through" connections between the outputs of PSK detector 1 and FEC decoder 7 in the presence of a logical-0 output from the threshold comparator 9 and establish cross-coupled connections between them in response to a logical-1 output from comparator 9 so that FEC decoder 7 reestablishes synchronization with the demodulated signals. A number of techniques are available to produce such phase control signals as described in Japanese Provisional Patent Publication 59-12654. The output of comparator 9 is applied to a frequency control circuit 11 which supplies a frequency control voltage to the VCO 5.

When the output of comparator 9 is at logic-0, frequency control circuit 10 interprets it as an indication that FEC decoder 7 is in synchronism with the demodulated signals and proceeds to compute the signal-to-noise ratio of the received PSK signal in a manner as will be described in detail hereinbelow. To derive signals representative of the power levels of both signal and noise components, a power detector 11 is connected to one of the outputs of PSK detector 1. Power detector 11 comprises an absolute value converter 12 which converts the Q-channel signal to a signal having an absolute value, which is averaged by an averaging circuit 13. The output of averaging circuit 13 is squared by a squaring circuit 14 to supply a signal $P_S$ representative of the power level of the signal component to frequency control circuit 10. The Q-channel output is also squared by a squaring circuit 15 whose output is averaged by an averaging circuit 16 to provide a signal $P_T$ representative of the total power level of both signal and noise components. The power representative signals $P_S$ and $P_T$ are supplied to a subtractor 17 to provide the frequency control circuit 10 with an output signal $P_N$ representative of the power level of the noise component.

Frequency control circuit 10 is a microprocessor-based controller having programmed steps as shown in FIG. 3. Program execution starts with operations block 30 which directs the sweeping of frequency control voltage V by incrementing it by a predetermined amount $\Delta V$. Exit then is to decision block 31 which checks to see if there is a logical-0 input from threshold comparator 9 indicating that FEC decoder 7 is synchronized with the demodulated signals. If the answer is negative, blocks 30 and 31 are repeated until synchronization is established in decoder 7 by the closed-loop synchronizer formed by phase shifter 6, integrator 7 and threshold comparator 9. Thus, the VCO control voltage is swept across a range of voltages in search of synchronization.

If there is a logic-0 input from comparator 9, the answer is affirmative in block 31 and control proceeds to operations block 32 which directs the initialization of a variable i to one. The initialization step is followed by operations block 33 which directs the setting of the control voltage V to a voltage $V_i$ which is one of a plurality of voltage levels stored in a lookup table as corresponding to possible frequency values, or candidate lock points at which the demodulator is likely to be synchronized with the symbol rate of the incoming PSK signal. Therefore, VCO 5 is driven at one of the candidate voltages, and the demodulator is synchronized with the symbol rate of the incoming signal in a lock point which may be either false or valid.

Exit then is to block 34 which directs the computing of the formula $10 \log_{10} (P_S/P_N)$ using the power level signals $P_S$ and $P_N$ supplied from power detector 11 to derive the signal-to-noise ratio S/N of that lock point. The signal-to-ratio value S/N derived in step 34 is stored in a location of the lookup table adjacent the corresponding candidate voltage $V_i$ to form with it a data set DS (block 35). Control exits to block 36 in which the variable i is compared with a constant K representing a maximum number of the voltage levels stored in the lookup table. If i is not equal to K, exit is to block 37 which increments the variable i by one and control returns to block 33 to set the control voltage V to the next candidate by selecting one from the lookup table. In this way, the VCO frequency is successively shifted from one candidate frequency value to another so that the demodulator is successively synchronized in different lock points. When all frequencies of the candidate lock points are tested, control exits from decision block 36 to operations block 38 which directs the detecting of data set DS having a maximum value of the signal-to-noise ratios stored in the lookup table, and proceeds to block 39 to set the control voltage V to the candidate voltage $V_i$ at which the maximum signal-to-noise ratio is derived. Synchronization that occurs at the lock point having the maximum signal-to-noise ratio is interpreted as a valid lock and synchronizations at all the other lock points are interpreted as false locks.

Figure 4:
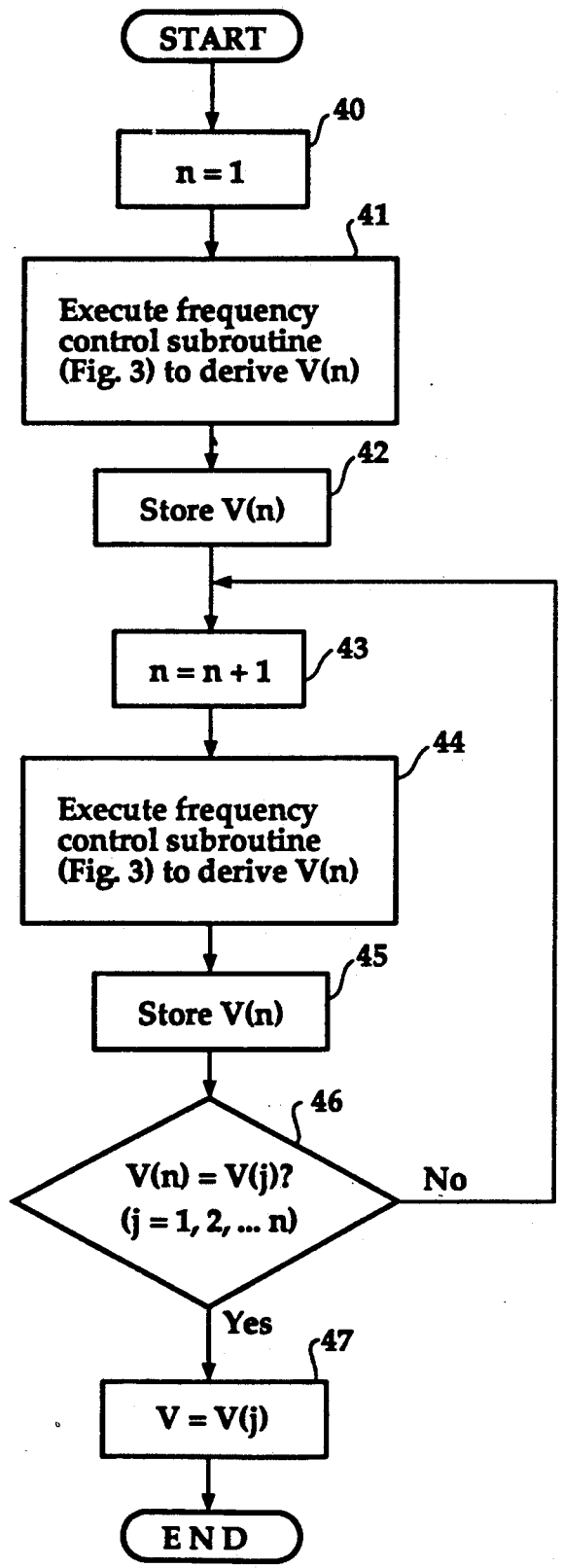
FIG. 4 is a flowchart describing additional steps performed by the frequency control circuit of FIG. 2.

In a preferred embodiment, frequency control circuit 10 is further programmed to repeat the process of FIG. 3 as shown in FIG. 4 to determine whether the lock point detected in a manner described above is one that occurs at a maximum likelihood frequency. This program starts with an initialization step 40 which directs the setting of a variable n to one. Control exits to block 41 to execute the frequency control subroutine of FIG. 3 to derive a frequency control voltage V(1). This voltage is stored in a memory (block 42) and control proceeds to block 43 to increment the variable n by one. The frequency control subroutine is repeated (block 44) to derive another frequency control voltage V(n) which is stored in the memory (block 45). Exit then is to decision block 46 in which any two of the stored voltages V(n) are compared with each other to detect equality therebetween. If frequency control signals having an equal value are not detected, control returns to block 43 to further increment the variable n to repeat the frequency control subroutine again to obtain another frequency control voltage V(n) for comparison with each of the stored voltage values V(n). The process is repeated until equality is detected between at least two stored values. When this occurs, the voltages V(j) having the equal value are interpreted as corresponding to a most likely frequency (where j=1,2, ... n), and control proceeds to block 47 to set the control voltage V to the most likely voltage V(j) with which VCO 10 is subsequently controlled.

It is seen from the foregoing that valid synchronization is established when the signal-to-noise ratio of a received convolutional PSK code signal is at a maximum if the bit error rate of the signal as detected at the output of FEC decoder 7 is smaller than a predetermined value.

Figure 5:
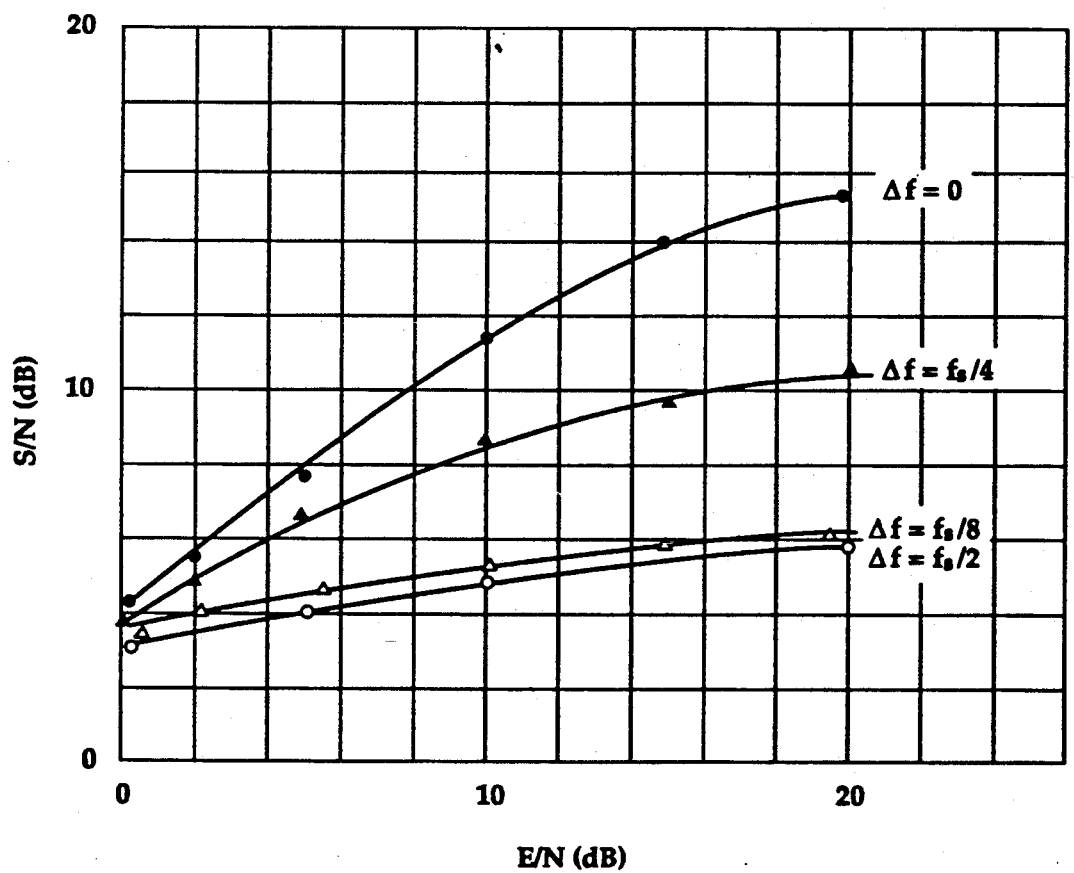
FIG. 5 is a graph representing signal-to-noise ratio plotted as a function of energy-to-noise ratio.

FIG. 5 is a plot of signal-to-noise ratio of the demodulated signal as a function of the ratio of energy per bit to noise of the incoming signal for a zero frequency deviation and non-zero frequency deviations obtained from computer simulation for purposes of comparison. It is seen that significant differences exist between the curve designated $\Delta f=0$ in which valid coherent state occurs and the curves designated $\Delta f=f_s/8$, $f_s/4$ and $f_s/2$ in which quasi-coherent states exist (where $f_s$ indicates frequency deviation of the recovered carrier from the symbol rate of received M-ary PSK convolutional codes).

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A coherent PSK (phase shift keying) demodulator comprising:
    PSK detector means for demodulating a received PSK modulated convolutional code with a recovered carrier to produce first- and second-channel convolutional codes;
    carrier recovery means for generating a variable frequency carrier as said recovered carrier, said carrier recovery means including phase detector means for controlling the phase of said variable frequency carrier according to a phase difference between said first- and second-channel convolutional codes;

convolutional decoder means for decoding said first- and second-channel convolutional codes, said decoder means being capable of generating an error correction signal in response to said first and second convolutional codes for correcting errors in said convolutional codes;

error rate detector means connected to said convolutional decoder means for comparing the number of said error correction signals generated during a predefined period of time with a threshold value and generating a sync detect signal indicating that said convolutional decoder means is synchronized with said first- and second-channel convolutional codes if said number is determined to be smaller than said threshold value;

power detector means connected to said PSK detector means for detecting power levels of a signal component and a noise component of one of said first- and second-channel codes; and frequency control means for performing the steps of (a) causing said carrier recovery means to generate a carrier having a continuously varying frequency until said sync detect signal is generated in search of a suboptimum frequency value at which said convolutional decoder means is synchronized, (b) causing said carrier recovery means to generate a carrier having a successively deviating frequency from said suboptimum frequency value and deriving successive values of signal-to-noise ratios from the power levels successively detected by said power detector means, and (c) causing said carrier recovery means to regenerate a carrier having a frequency which deviates from said frequency value by an amount corresponding to a maximum value of said derived signal-to-noise ratios.

2. A coherent PSK demodulator as claimed in claim 1, further comprising phase shifter means connected between said PSK detector means and said convolutional decoder means for correcting the phase of said first- and second-channel convolutional codes in the absence of said sync detect signal of said error rate detector means.

3. A coherent PSK demodulator as claimed in claim 1 wherein said frequency control means provides the steps of:

repeating the steps (b) and (c) in order to generate a plurality of carriers as maximum likelihood candidates;

detecting two of said candidates having an equal value; and causing said carrier recovery means to regenerate the carrier having a frequency corresponding to the detected candidates.

4. A coherent PSK demodulator as claimed in claim 1, wherein said frequency control means causes said carrier recovery means to deviate said carrier frequency corresponding to frequencies at which said demodulator is likely to be synchronized with a symbol rate of said PSK signal.

5. In a coherent PSK (phase shift keying) demodulator having a PSK detector means for demodulating a received PSK modulated convolutional code with a recovered carrier to produce first- and second-channel convolutional codes and power level detector means for detecting power levels of a signal component and a noise component of one of said first- and second-channel convolutional codes, a method for establishing synchronization comprising the steps of:

a) controlling the phase of said recovered carrier according to a phase difference between said first- and second-channel convolutional codes;

b) decoding the phase-controlled first- and second-channel convolutional codes and correcting errors in said convolutional codes by using error correction signals;

c) comparing a threshold value with the number of said error correction signals generated during a predetermined period of time and detecting a suboptimum frequency value of said recovered carrier by continuously varying the frequency thereof until said number becomes smaller than said threshold value;

d) causing the frequency of said recovered carrier to successively deviate from said suboptimum frequency value to produce frequency deviations, and deriving successive values of signal-to-noise ratios from the power levels respectively detected by said power level detector means corresponding to said frequency deviations; and e) detecting a maximum value of said successive signal-to-noise ratios and causing the recovered carrier to maintain the frequency deviation corresponding to said maximum value.

6. A method as claimed in claim 5, further comprising the step of correcting the phase of said first- and second-channel convolutional codes if said number is determined by the step (c) as being greater than said threshold value.

7. A method as claimed in claim 5, further comprising the steps of:

repeating the steps (d) and (f) to produce a plurality of said maximum values;

storing multiple frequency deviations corresponding to said maximum values as maximum likelihood candidates;

detecting two of said stored frequency deviations having an equal value; and controlling said recovered carrier at a frequency corresponding to said detected frequency deviations.

8. A method is claimed in claim 5, wherein said frequency deviations correspond respectively to frequencies at which said demodulator is likely to be synchronized with a symbol rate of said PSK signal.

* * * * *